Figure 1:
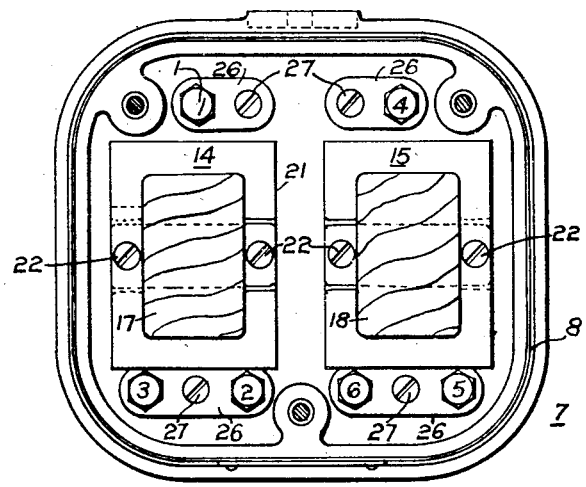

April 10, 1928. 1,665,854

B. E. LENEHAN

ALTERNATING CURRENT DEVICE

Filed Dec. 15, 1924

WITNESSES:
Alf Schiefelbein
F. H. Miller

INVENTOR
Bernard E Lenehan
BY
Wesley G. Carr
ATTORNEY

Patented Apr. 10, 1928.

1,665,854

UNITED STATES PATENT OFFICE.

BERNARD E. LENEHAN, OF WILKINSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT DEVICE.

Application filed December 15, 1924. Serial No. 755,862.

My invention relates to alternating-current devices and particularly to means for readily adapting standard wattmeters for operation as reactive-volt-ampere meters.

One object of my invention is to provide a device of the above indicated character that shall be adapted for use between a three-phase circuit and a meter having only three voltage leads.

Another object of my invention is to provide a compact unitary structure that shall constitute the sole means between a polyphase circuit and a wattmeter for energizing the latter in accordance with the reactive volt amperes of the circuit.

Another object of my invention is to provide a novel combination of auto-transformers wherein secondary voltages may have predetermined relation to the various phase voltages of a polyphase circuit.

Another object of my invention is to provide a reactive-component compensator or adapter for a wattmeter that shall permit the latter to operate accurately on both balanced and unbalanced loads.

A further object of my invention is to provide an alternating current phase-displacing device that shall be simple and durable in construction, economical to manufacture and effective in its operation.

Heretofore, in adapting watthour and induction meters to operate as reactive-volt-ampere hour meters, it has been usual to employ special potential transformers and small auto-transformers to obtain voltages ninety degrees out of phase from the line voltages. In such arrangement of parts, the conversion of the meter is a comparatively simple matter because both the meter and the transformers have four voltage leads which may readily be connected.

However, nearly all wattmeters of standard types have only three voltage terminals and the above-mentioned arrangement of transformers that is employed in connection with watthour meters is not suitable for use in connection with wattmeters.

In adapting a wattmeter to operate as a reactive component meter in a three-phase circuit, special connections, which are correct only on balanced loads, have been employed.

It is my aim to simplify the conversion of the ordinary standard polyphase wattmeter for operation as a reactive-component meter by the use of a compact unitary structure which may readily be connected between a meter and a line circuit without special connections and which will be effective on both balanced and unbalanced loads.

Accordingly, in practicing my invention, I provide a unitary device including a pair of auto-transformers that are so constructed and connected as to provide secondary voltage leads for connection to a wattmeter and between which voltages exist ninety degrees out of phase with the voltages across the several phases of a circuit of which a measurement is desired.

Figure 1 of the accompanying drawings is an elevational view, with a side plate removed, of a device constructed in accordance with my invention.

Figure 3:
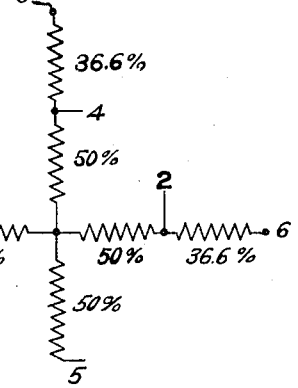
Figure 2:
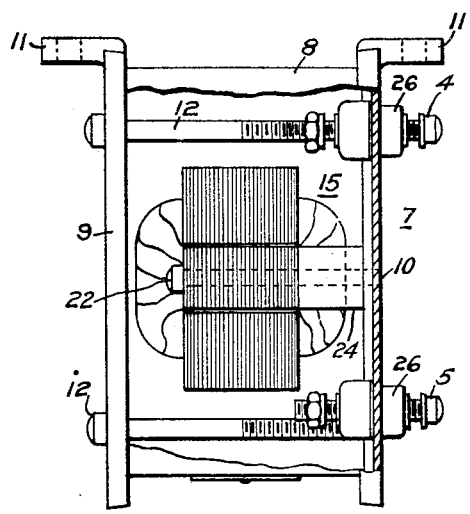
Figure 4:
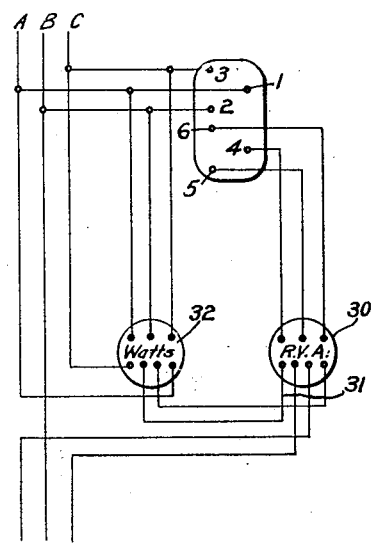

Fig. 2 is an elevational view of the structure shown in Fig. 1, taken at right angles thereto, with parts broken away, Fig. 3 is a diagram of the windings and taps of the device, and Fig. 4 is a diagram showing a line circuit, a wattmeter connected thereto, and the device of my invention connected between the circuit and another wattmeter to operate the latter as a reactive-volt-ampere meter.

The device comprises, in general, a casing or supporting structure 7, including a side-wall member 8, end-wall members 9 and 10 having supporting lugs 11 thereon, clamping bolts 12 extending between the end walls 9 and 10, a pair of auto-tranformers 14 and 15, primary taps or terminals 1, 2 and 3 and secondary terminal members 4, 5 and 6.

The auto-transformers 14 and 15 similarly comprise windings 17 and 18, respectively, that are mounted on core members 21 and supported on the end wall 10 by screws 22 which extend through the core members and through spacing blocks 24 for positioning the transformers on the wall 10.

The terminal members 1, 2, 3, 4, 5, and 6, similarly extend through insulating bushings 26 that extend through the wall 10 and are held in position by screws 27.

The electrical relation and connections between the windings 17 and 18 and the terminals are clearly shown in Fig. 3, in which the transformer coil portions between the several terminals are arranged to provide voltages in ratios of 36.6, 50 and 50 between consecutive terminals, each phase, or auto-transformer 14 or 15, being provided with two intermediate taps at points corresponding, respectively, to 26.8 and 63.4 percent of the total number of turns.

The three-phase primary voltages are applied to the terminals 1, 2, and 3, and two-phase voltages are produced between terminals 1 and 2 and between terminals 4 and 5 which are transformed to another set of three-phase voltages between the terminals 4, 5 and 6 which are ninety degrees out of phase from the voltages across the terminals 1, 2 and 3.

As shown in Fig. 4, the terminals 1, 2 and 3 are connected to the conductors A, B and C, respectively, of a three-phase circuit, and the terminals 4, 5 and 6 are connected to the voltage terminals of an ordinary wattmeter 30 which, with its usual current leads 31, thereby becomes a reactive-volt-ampere meter. With the meter 30 and a usual wattmeter 32 connected to the line, as shown, both the watts and the reactive watts are indicated.

While I have shown and described one form of my invention, various modifications and changes may be made therein without departing from the spirit and scope thereof, as set forth in the appended claims.

I claim as my invention:

1. A polyphase transformer connection comprising two phases having intermediate taps at points corresponding, respectively, to 26.8 and 63.4 percent of the total number of turns in each phase, the 63.4 percent points being connected together, a three-phase primary connection to the 26.8 and 100 percent points of one phase and the zero percent point of the second phase, and a three-phase secondary connection to the 26.8 and 100 percent points of the second phase and the zero percent point of the first phase.

2. A polyphase transformer connection comprising two phases, a common connection between said phases at intermediate points thereof, a three-phase primary connection having two leads connected to one of said phases at points equidistant from said common connection and having a third lead connected to the second phase at such point as to provide a balanced three-phase connection, and a three-phase secondary connection having two leads connected to the second phase at points equidistant from said common connection and having a third lead connected to the first phase at such point as to provide a balanced three-phase connection.

3. The combination with a three-phase circuit, of a pair of auto-transformers comprising windings having a common connection dividing said windings into four parts, primary leads connected between the circuit conductors and three of said parts and secondary leads connected to three of said parts including one part not included in the primary-lead connection.

4. The combination with a three-phase circuit, of a pair of auto-transformers comprising windings having a common connection dividing said windings into four parts, three primary leads connected between the circuit conductors and three of said parts and three secondary leads connected to three of said parts including one part not included in the primary-lead connection.

5. The combination with a three-phase circuit, of a pair of auto-transformers comprising windings having a common connection dividing said windings into four parts, two primary leads connected between the circuit conductors and the outer ends of two of said parts, a third primary lead connected between a conductor of said circuit and an intermediate point in another of said parts, two secondary leads connected to the outer ends of two of said parts and a third secondary lead connected to an intermediate point in another of said parts.

6. The combination with a three-phase circuit, of a pair of auto-transformers comprising windings having a common connection dividing said windings into four parts, two primary leads connected between the circuit conductors and the outer ends of two of said parts, a third primary lead connected between a conductor of said circuit and an intermediate point in another of said parts, two secondary leads connected to the outer ends of two of said parts, one of which is the part to which said intermediate primary lead is connected, and a third secondary lead connected to an intermediate point in one of the parts to which a primary lead is connected at the end thereof.

7. The combination with a three-phase circuit, of a pair of auto-transformers comprising windings having a common connection dividing said windings into four parts, two primary leads connected between the circuit conductors and the outer ends of two of said parts, a third primary lead connected between a conductor of said circuit and an intermediate point in another of said parts, two secondary leads connected to the outer ends of two of said parts, one of which is the part to which said intermediate primary lead is connected and the other of which is a part to which none of the primary leads is connected, and a third secondary lead connected to an intermediate point in one of the parts to which a primary lead is connected at the end thereof.

8. The combination with a three-phase meter having only three voltage terminals, of a voltage transformer for connection to a three-phase circuit and comprising three secondary terminals for connection to said meter terminals and between which voltages exist ninety degrees out of phase with the several phases of said circuit.

9. The combination with a polyphase circuit and a polyphase meter having a number of voltage terminals corresponding to the number of phases of said circuit, of a voltage transformer having primary leads connected to said circuit and a number of secondary leads corresponding to the number of said meter terminals connected thereto for impressing voltages thereacross ninety degrees out of phase with the several phases of said circuit.

10. The combination with a three-phase meter having only three voltage terminals, of a voltage transformer for connection to a three-phase circuit and comprising three secondary terminals for connection to said meter terminals and between which voltages exist for accurately operating the meter in accordance with reactive power irrespective of unbalanced conditions in said circuit.

11. The combination with a three-phase meter having only three voltage terminals, of a voltage transformer for connection to a three-phase circuit and comprising two phases, a common connection between said phases at intermediate points thereof, a three-phase primary connection having two leads connected to one of said phases at points equidistant from said common connection and having a third lead connected to the second phase at such point as to provide a balanced three-phase connection, and a three-phase secondary connection having two leads connected to the second phase at points equidistant from said common connection and having a third lead connected to the first phase at such point as to provide a balanced three-phase connection.

In testimony whereof, I have hereunto subscribed my name this 4th day of December, 1924.

BERNARD E. LENEHAN.